United States Patent
Ferrell, Jr. et al.

(10) Patent No.: US 9,758,713 B1
(45) Date of Patent: Sep. 12, 2017

(54) WELL CEMENTING

(71) Applicants: James C. Ferrell, Jr., Houston, TX (US); Kurt O. Lindstrom, Forney, TX (US); Luis M. Perales, Richardson, TX (US); Hongfeng Ren, Rowlett, TX (US)

(72) Inventors: James C. Ferrell, Jr., Houston, TX (US); Kurt O. Lindstrom, Forney, TX (US); Luis M. Perales, Richardson, TX (US); Hongfeng Ren, Rowlett, TX (US)

(73) Assignee: FRITZ INDUSTRIES, INC., Dallas, TX (US)

( * ) Notice: Subject to any disclaimer, the term of this patent is extended or adjusted under 35 U.S.C. 154(b) by 0 days.

(21) Appl. No.: 14/999,031

(22) Filed: Mar. 21, 2016

Related U.S. Application Data

(62) Division of application No. 13/998,676, filed on Nov. 22, 2013, now Pat. No. 9,321,953.

(51) Int. Cl.
| | |
|---|---|
| *C09K 8/00* | (2006.01) |
| *C04B 28/02* | (2006.01) |
| *C09K 8/487* | (2006.01) |
| *C04B 24/28* | (2006.01) |
| *C04B 7/00* | (2006.01) |

(52) U.S. Cl.
CPC ............... *C09K 8/487* (2013.01); *C04B 7/00* (2013.01); *C04B 24/287* (2013.01)

(58) Field of Classification Search
CPC .......... C09K 8/487; C04B 24/287; C04B 7/00
USPC ........................................ 523/130; 524/650
See application file for complete search history.

(56) References Cited

U.S. PATENT DOCUMENTS

| | | | |
|---|---|---|---|
| 2,868,753 A | 1/1959 | Morgan et al. |
| 3,116,264 A | 12/1963 | Wahl |
| 3,140,269 A | 7/1964 | Wahl et al. |
| 3,465,825 A | 9/1969 | Hook et al. |
| 3,499,491 A | 3/1970 | Wyant et al. |
| 3,943,083 A | 3/1976 | Adams et al. |
| 3,952,805 A | 4/1976 | Persinski et al. |
| 3,994,852 A | 11/1976 | Adams et al. |
| 4,015,991 A | 4/1977 | Persinski et al. |
| 4,036,660 A | 7/1977 | Persinski et al. |
| 4,515,635 A | 5/1985 | Rao et al. |
| 4,555,269 A | 11/1985 | Rao et al. |
| 4,557,763 A | 12/1985 | George et al. |
| 4,582,139 A | 4/1986 | Childs et al. |
| 4,594,169 A | 6/1986 | Saito et al. |
| 4,632,186 A | 12/1986 | Boncan et al. |
| 4,640,942 A | 2/1987 | Brothers |
| 4,650,522 A | 3/1987 | Teraji et al. |
| 4,674,574 A | 6/1987 | Savoly et al. |
| 4,676,317 A | 6/1987 | Fry et al. |
| 4,700,780 A | 10/1987 | Brothers |
| 4,703,801 A | 11/1987 | Fry et al. |
| 4,806,164 A | 2/1989 | Brothers |
| 4,938,803 A | 7/1990 | Huddleston et al. |
| 4,941,536 A | 7/1990 | Brothers et al. |
| 4,997,487 A | 3/1991 | Vinson et al. |
| 5,028,271 A | 7/1991 | Huddleston et al. |
| 5,049,288 A | 9/1991 | Brothers et al. |
| 5,099,922 A | 3/1992 | Ganguli |
| 5,116,421 A | 5/1992 | Ganguli |
| 5,153,240 A | 10/1992 | Stephens |
| 5,184,680 A | 2/1993 | Totten et al. |
| 5,217,531 A | 6/1993 | Cheung |
| 5,229,019 A | 7/1993 | Forrest |
| 5,252,128 A | 10/1993 | Gopalkrishnan |
| 5,258,428 A | 11/1993 | Gopalkrishnan |
| 5,260,391 A | 11/1993 | Stephens |
| 5,262,452 A | 11/1993 | Gopalkrishnan |
| 5,263,542 A | 11/1993 | Brothers |
| 5,273,580 A | 12/1993 | Totten et al. |
| 5,294,651 A | 3/1994 | Stephens |
| 5,336,316 A | 8/1994 | Dawson et al. |
| 5,339,903 A | 8/1994 | Eoff et al. |
| 5,536,311 A | 7/1996 | Rodrigues |
| 5,613,558 A | 3/1997 | Dillenbeck |
| 5,658,380 A | 8/1997 | Dillenbeck |
| 5,716,910 A | 2/1998 | Totten et al. |
| 5,851,960 A | 12/1998 | Totten et al. |
| 5,988,279 A | 11/1999 | Udarbe |
| 6,085,840 A | 7/2000 | Laramay et al. |
| 6,089,318 A | 7/2000 | Laramay et al. |
| 6,136,935 A | 10/2000 | Udarbe |
| 6,145,591 A | 11/2000 | Boncan et al. |
| 6,156,808 A | 12/2000 | Chatterji et al. |
| 6,180,689 B1 | 1/2001 | Moulin |
| 6,184,287 B1 | 2/2001 | Westerman |
| 6,235,809 B1 | 5/2001 | DiLullo Arias et al. |
| 6,297,202 B1 | 10/2001 | Chatterji et al. |
| 6,312,515 B1 | 11/2001 | Barlet-Gouedard et al. |
| 6,365,647 B1 | 4/2002 | Westerman |
| 6,448,311 B1 | 9/2002 | Walker |

(Continued)

FOREIGN PATENT DOCUMENTS

| | | | |
|---|---|---|---|
| CN | 102191027 A | 9/2011 | ............ C09K 8/487 |
| WO | WO 2009/094662 | 7/2009 | |

*Primary Examiner* — David Karst

(74) *Attorney, Agent, or Firm* — Thomas R. Weaver

(57) ABSTRACT

A hydraulic cementing composition and a method of making the same is disclosed. The composition is useful to form a sheath of hardened cement in the annular space between a well pipe disposed in a well bore and the walls of the well bore. The cementing composition is a mixture of dry ingredients comprising hydraulic cement and an additive to control the loss of fluid from an aqueous slurry containing the cementing composition. The fluid loss additive and a method of making the same is disclosed. The fluid loss additive is the reaction product of three chemical compounds each having an ethylene backbone and functional groups selected from carboxylates, hydrogen, anhydrides and combinations thereof.

11 Claims, No Drawings

(56) References Cited

U.S. PATENT DOCUMENTS

| | | |
|---|---|---|
| 6,465,587 B1 | 10/2002 | Bair et al. |
| 6,488,764 B2 | 12/2002 | Westerman |
| 6,508,305 B1 | 1/2003 | Brannon et al. |
| 6,590,050 B1 | 7/2003 | Bair et al. |
| 6,626,243 B1 | 9/2003 | Boncan |
| 6,686,330 B2 | 2/2004 | Jordan et al. |
| 6,715,552 B2 | 4/2004 | Eoff et al. |
| 6,767,867 B2 | 7/2004 | Chaterji et al. |
| 6,875,729 B2 | 4/2005 | Verlaan et al. |
| 7,044,170 B2 | 5/2006 | Goodwin |
| 7,087,556 B2 | 8/2006 | Chen et al. |
| 7,213,646 B2 | 5/2007 | Roddy et al. |
| 7,448,450 B2 | 11/2008 | Luke et al. |
| 7,462,234 B2 | 12/2008 | Reddy et al. |
| 7,576,040 B2 * | 8/2009 | Lewis ............... C04B 24/2688 166/295 |
| 7,650,940 B2 | 1/2010 | Reddy et al. |
| 7,731,793 B2 | 6/2010 | Beckman |
| 7,790,815 B2 | 9/2010 | Vicari |
| 7,815,731 B2 | 10/2010 | Beckman |
| 7,838,597 B2 | 11/2010 | George et al. |
| 7,891,424 B2 | 2/2011 | Creel et al. |
| 7,896,076 B2 | 3/2011 | Drochan |
| 7,928,042 B2 | 4/2011 | Reed et al. |
| 7,994,265 B2 | 8/2011 | Vicari |
| 2003/0008779 A1 | 1/2003 | Chen et al. |
| 2004/0094070 A1 | 5/2004 | Eoff et al. |
| 2004/0159431 A1 | 8/2004 | Eoff et al. |
| 2006/0041060 A1 | 2/2006 | George et al. |
| 2006/0047062 A1 | 3/2006 | Hsu et al. |
| 2006/0234871 A1 | 10/2006 | Dalrymple et al. |
| 2010/0022419 A1 | 1/2010 | Reed et al. |
| 2010/0144560 A1 * | 6/2010 | Beall ....................... C09K 8/12 507/131 |
| 2010/0314112 A1 | 12/2010 | Spangle |

* cited by examiner

WELL CEMENTING

This is a Division of pending application Ser. No. 13/998,676, filed Nov. 22, 2013.

BACKGROUND OF THE INVENTION

1. Technical Field of the Invention

This invention broadly relates to cementing. The invention further relates to a cement composition for supporting pipe in a borehole which penetrates one or more subsurface earth formations. The invention still further relates to an additive included in a hydraulic cementing composition. The invention more specifically relates to a copolymer additive useful to reduce the loss of water from a slurry of hydraulic cement in water.

2. Description of the Prior Art and Problems Solved

It is known in the art of well cementing to form a sheath of hardened cement in the annular space between a well pipe, such as a casing, and the walls of a well bore which penetrates a subterranean earth formation. The purpose of the sheath is to support the casing in the well bore and to prevent undesirable movement of formation fluids, such as oil, gas and water, within the annular space between subsurface formations and/or to the surface of the earth: The process of forming the sheath is referred to in the art as primary cementing.

In the art of primary cementing, a slurry of hydraulic cement in water is pumped down the interior of the casing and caused to circulate up from the bottom of the casing in the annulus to a desired location therein, and then permitted to remain undisturbed in the annulus for a time sufficient to enable the hydraulic cement to react with the water in the slurry, i.e., set, to produce the sheath of hardened cement.

A slurry of hydraulic cement in water, when first placed in the annulus, and for a period of time thereafter, acts as a true liquid and can transmit hydrostatic pressure. Loss of water from the slurry to the formation, referred to as fluid loss, causes a reduction in slurry volume which can cause pressure loss. Gas migration within the setting slurry can occur if pressure loss occurs at a time when the slurry has gelled to degree which prevents full transmission of hydrostatic pressure.

A slurry of hydraulic cement, over a period of time, sets into a hardened mass having compressive strength. It is believed that the hardening process experiences three phases.

During the first phase of the hardening process, it is believed that the setting slurry retains liquid sufficient to enable it to transmit full hydrostatic pressure in the well bore through the column of cement slurry. It is believed that gas migration will not occur if there is sufficient transmitted pressure to oppose formation gas pressure. The first phase ends when the developed static gel strength attains a first critical value which is believed to be about 100 lb-force/100 sq. ft. The period of time required for a slurry of hydraulic cement to reach the first critical value is referred to as zero gel time. Zero gel time is thus defined as the time required for a slurry to develop a static gel strength of about 100 lb-force/100 sq. ft. During this time, it is believed that the volume of fluid lost to the formation will not result in loss of pressure across a gas zone in an amount sufficient to permit gas migration.

During the second phase of the hardening process, the developed static gel strength exceeds the first critical value. The setting slurry loses the ability to transmit full hydrostatic pressure, but fluid loss continues. As a setting slurry passes from a fluid state to a gelled state, defined as the transition period, hydrostatic pressure cannot be fully transmitted. Accordingly, any loss of fluid volume during the transition period will cause loss of pressure across a gas zone, which could result in gas migration. The second phase ends when the developed gel strength attains a second critical value which is sufficient to resist formation gas pressure. It is believed that the second critical value is about 500 lb-force/100 sq. ft. The purpose of a fluid loss additive is to provide fluid loss control during the transition period. It is desired that the transition time be as short as possible.

During the third phase of the hardening process gas migration is prevented if a gas channel has not been previously formed, because developed gel strength is greater than the second critical value and is sufficient to resist formation gas pressure.

It is desirable to extend zero gel time and to reduce transition time. The loss of fluid from a slurry of hydraulic cement in water increases with increase in bottom hole circulating temperature. Accordingly, a material to be added to a slurry of hydraulic cement to extend zero gel time and to reduce transition time, while reducing fluid loss rate at high temperatures, is a problem addressed herein.

Laramay et al (U.S. Pat. No. 6,089,318) discuss problems caused by fluid loss. Such problems include gas migration, the development of inadequate static gel strength, and the formation of channels in the sheath of cement. The discussion is included herein by reference.

Laramay et al disclose a composition which reduces fluid loss from a slurry of hydraulic cement in water at temperatures up to 400° F. and particularly above 200° F. The composition disclosed by Laramay et al is the copolymerization reaction product of a vinylamide morpholine derivative with a styrene sulfonic acid salt, when performed in the presence of a humate. The preferred vinylamide morpholine derivative is acryloylmorpholine. The preferred styrene sulfonic acid is sodium styrene sulfonate. The humate employed is potassium humate.

Laramay et al further disclose that acrylamide and derivatives of acrylamide can be employed along with the previously mentioned components to produce the composition of their invention. Examples of such optional compounds mentioned by Laramay et al include acrylamide, the sodium salt of 2-acrylamido-2-methylpropanesulfonic acid and N,N-dimethylacrylamide.

It is known in the art that a slurry of hydraulic cement is comprised of particles of a hydraulic cement suspended or dispersed in water. The slurry can also include various added materials, for example, fluid loss additives, dispersants, suspension agents, strength stabilizing agents, set time retarders, set time retarder intensifiers and defoamers.

A slurry of hydraulic cement in water can be caused to flow, such as with pumping equipment, down a well pipe and then upwardly into an annular space where it is permitted to remain static while it sets into a hardened sheath. The study of the ability of a slurry of hydraulic cement in water to flow is included in a term broadly referred to as rheology, which, in large part, is concerned with the flow of matter in the liquid phase. Such liquids can be classed as either Newtonian fluids or as non-Newtonian fluids. A non-Newtonian fluid exhibits an apparent change in viscosity with rate of change of strain (strain rate). A slurry of hydraulic cement in water is a non-Newtonian fluid.

A rheological property of a slurry of hydraulic cement in water which is of particular interest to persons skilled in the art of well cementing is the ability of the slurry to suspend the particles of cement in the fluid. The rheological properties must be adequate to suspend solids at surface conditions during mixing, and also at down hole temperature and pressure. The goal is to prevent solids settling and bridging while pumping. Instruments employed to measure this settling property provide numerical readings at various shear rates (measured in rpm). As a general rule, higher numerical readings indicate satisfactory suspension and lower readings indicate less satisfactory to unacceptable suspension. A combination of materials added to a slurry can be necessary to provide a slurry having low water loss, as well as satisfactory solids suspension and acceptable pumping time.

Consistency is a rheological property of a fluid which is related to cohesion of individual particles of a material in the fluid, such as the particles of cement in the slurry, the ability of the fluid to deform and its resistance to flow. The consistency of a cement slurry is determined by thickening time tests and is a measure of the ability of the slurry to be pumped. Consistency is, accordingly, a measure of the pumpability of the slurry.

It is clear that the slurry must contain a sufficient quantity of water to enable sufficient hydration of the cement particles. In addition, there must be a sufficient quantity of water in the slurry to enable it to be pumped, but not so much that the consistency (sometimes known as apparent viscosity) of the slurry is not sufficient to retain the particles of cement in suspension during the hardening process.

Rheology, including consistency, is effected by fluid loss. Fluid loss can be adjusted by materials added to a cementing composition. Such materials include fluid loss additives, suspending agents and dispersants. This invention, accordingly, further addresses cementing compositions comprised of fluid loss additives, dispersants and suspending agents.

SUMMARY OF THE INVENTION

This invention provides a cementing composition which is useful to form a sheath of hardened cement in the annular space between a well pipe disposed in a well bore and the walls of the well bore. The cementing composition is a mixture of dry ingredients comprising hydraulic cement, a fluid loss additive and one or more other additive materials. When the cementing composition is mixed with water a slurry is produced which can be pumped into the mentioned annular space. The produced slurry can suspend solid particles while the slurry sets into a hardened mass, and exhibits low fluid loss at temperatures up to about 400° F.

The invention also provides a method of making the cementing composition and the mentioned pumpable slurry containing the cementing composition.

The invention further provides a material which is added to the cementing composition to control the loss of fluid from the slurry containing the cementing composition. The material is hereinafter referred to as the fluid loss additive of this invention.

The fluid loss additive of this invention is the reaction product of a number of chemical compounds each having an ethylene backbone and functional groups selected from carboxylates, such as sodium carboxylate, hydrogen, anhydrides and combinations thereof.

The invention still further provides a method of making the fluid loss additive of this invention.

DESCRIPTION OF THE INVENTION

1. Fluid Loss Additive

It has now been discovered that reacting a first compound, a second compound and a third compound in the presence of an effective quantity of a humate produces a product which can be used as a fluid loss additive for a hydraulic cementing composition. The fluid loss additive is water soluble and can be added to a hydraulic cement composition in solution form or in solid form.

The first compound is a sulfonic acid acrylic monomer selected from compounds represented by the general formula:

$$CH_2=CR_1-C(=O)-NR_2R_3 \qquad (1)$$

wherein $R_1$ is —H or —$CH_3$; $R_2$ is —H, —$CH_3$ or —$CH_2CH_3$; and $R_3$ is —$C(CH_3)_2$—$CH_2$—$S(=O)_2$—OX, wherein X is —H or —$NH_4$ or is selected from Group 1A metals such as —Na.

Examples of the sulfonic acid acrylic monomer defined in formula (1) include 2-acrylamido-2-methylpropanesufonic acid, the sodium salt of 2-acrylamido-2-methylpropanesufonic acid and the ammonium salt of 2-acrylamido-2-methylpropanesufonic acid.

The second compound is acrylamide, an acrylamide derivative or a vinylamide morpholine derivative.

The acrylamide and acrylamide derivative is selected from compounds represented by the general formula:

$$CH_2=CR_4-C(=O)-NR_5R_6 \qquad (2)$$

wherein $R_4$ is —H or —$CH_3$; $R_5$ is —H, —$CH_3$ or —$CH_2CH_3$; and $R_6$ is —H, —$CH_3$, —$CH_2CH_3$, —$CH(CH_3)_2$ or —$C(CH_3)_3$.

Examples of the compounds defined in formula (2) include acrylamide, methacrylamide, N-methylacrylamide, N-i-propylacrylamide, N-i-propylmethacrylamide, N-t-butylacrylamide, N-t-butylmethacrylamide, N,N-dimethylacrylamide and N,N-dimethylmethacrylamide.

The vinylamide morpholine derivative is selected from compounds represented by the general formula:

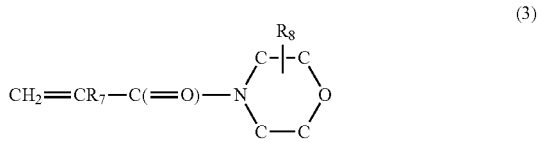

wherein $R_7$ is —H or —$CH_3$ and $R_8$ is —H, —$CH_3$ or —$CH_2CH_3$ and is positioned on any one of the four carbons in the morpholine ring.

Examples of the vinylamide morpholine derivative defined in formula (3) include acryloylmorpholine and methacryloylmorpholine.

The third compound is an ethylene derivative having terminal ends selected from carboxylic acid groups, carboxylate groups, such as sodium carboxylate, hydrogen, anhydride groups and combinations thereof. The third compound is selected from compounds represented by the general formula:

$$R_9R_{11}C=CR_{10}R_{12} \qquad (4)$$

wherein: $R_9$ is —C(=O)OH, —C(=O)ONa, or —$CH_2$C(=O)OH; $R_{10}$ is, —C(=O)OH or —H; $R_{11}$ is —C(=O)OH or —H and $R_{12}$ is —H; or $R_9$ and $R_{10}$ are each carbonyl groups joined to oxygen to form an anhydride group, —C(=O)—O—C(=O)—.

Some compounds within the scope of formula (4) include maleic acid, fumaric acid, acrylic acid, sodium acrylate, itaconic acid and maleic anhydride.

The preferred first compound is the sodium salt of 2-acrylamido-2-methylpropanesufonic acid. The preferred second compound is N,N-dimethylacrylamide. The preferred third compound is maleic anhydride.

The term humate, as used herein, is a generalization for any naturally occurring derivative of humic acid. Humic acids are allomelanins found in soils, coals and peat resulting from the decomposition of organic matter, particularly dead plants, and consist of a mixture of complex macro molecules having a polymeric phenolic structure. A humate useful herein is available from Black Earth Humic LP under the trademark BlackEarth As used herein the quantity of humate employed is expressed as a quantity of potassium humate.

The method of copolymerizing the first, second and third compounds to produce the fluid loss additive of this invention is broadly comprised of the steps of forming an aqueous medium having the humate dispersed/dissolved therein, dissolving the monomer reactants in the aqueous medium and then causing the monomer reactants to produce the fluid loss additive of this invention. As a final optional step, the fluid loss additive, which is present in solution in the reaction mass, can be recovered as a dry, particulate solid for further use as a dry additive for a hydraulic cement composition.

In the first step, a first aqueous medium is formulated by mixing water with an aqueous solution of sodium hydroxide followed by mixing the humate with the resulting solution. Water is placed in the first aqueous medium in an amount in the range of from about 31 to about 85 and preferably about 52 weight percent of the entire reaction mass. The water is preferably D.I, water. The aqueous solution of sodium hydroxide is placed in the first aqueous medium in an amount in the range of from about 1.3 to about 1.7 and preferably about 1.5 weight percent of the entire reaction mass, wherein the sodium hydroxide solution contains about 50 weight percent sodium hydroxide. Humate is placed in the first aqueous medium in an amount in the range of from about 1 to about 11 and preferably about 6 weight percent of the entire reaction mass, wherein the humate is calculated as 12 percent by weight active potassium humate.

The first aqueous medium is stirred for a short time to insure complete mixing/dispersion of the contents, thereafter the monomer reactants, that is, the above described first compound, second compound and third compound, are added, in sequence, to the first aqueous medium with stirring. The monomer reactants are added to the first aqueous medium in a combined quantity in the range of from about 26 to about 52 and preferably about 38 weight percent of the entire reaction mass. The first and second compounds are present in the reaction mass in the range of from about 1.5 to about 2.7, preferably from about 1.6 to about 2.1 and still more preferably about 1.8 moles of the first compound per mole of the second said compound. The first and third compounds are present in the reaction mass in the range of from about 4.8 to about 9.8, preferably from about 6.1 to about 7.8 and still more preferably about 7.5 moles of the first compound per mole of the third compound. After all of the monomer reactants are completely dissolved, the pH of the mix is adjusted, such as with caustic soda, to a value in the range of from about 8 to about 10.5, preferably about 9, to thereby form a second aqueous medium. Stirring continues and the temperature of the second aqueous medium is heated to a reaction temperature of about 114° F.

Activator ingredients are added to the second aqueous medium to cause the polymerization reaction to proceed. The activator ingredients include water, a chain transfer agent and a polymerization initiator to thereby complete the entire reaction mass. The activator ingredients are added to the second aqueous medium in a combined quantity in the range of from about 3.1 to about 4.3 and preferably in an amount of about 3.8 weight percent of the entire reaction mass. The chain transfer agent is added to the second aqueous medium in an amount of about 0.01 weight percent of the entire reaction mass and the polymerization initiator is added to the second aqueous medium in an amount in the range of from about 0.39 to 0.60, and preferably in an amount of about 0.46 weight percent of the entire reaction mass. The water constituent of the activator ingredients is preferably divided into about two equal weight portions each of which are added to the second aqueous medium to thereby form the entire reaction mass.

The temperature of the reaction mass increases upon addition of the activator ingredients to the second aqueous medium. The temperature of the water bath is adjusted to maintain the reaction temperature at a value of about 140° F. which such temperature is maintained for 2 hours while stirring continues.

The chain transfer agent can be tetraethylenepentamine, mercaptoethanol and sodium allylsulfonate.

The polymerization initiator can be initiators known in the art including sodium persulfate, potassium perborate and ammonium persulfate.

After completion of the 2 hour polymerization reaction, the reaction mass can be diluted with water and then dried to produce a solid product which is useful as the fluid loss additive of this invention. The drying process can include the steps of placing the liquid reaction mass on the rollers of a drum dryer to form a dry polymer product.

2. Hydraulic Cement Composition

It has been discovered that a dry hydraulic cement composition containing the fluid loss additive of this invention, when mixed with either fresh or salt water, produces a slurry which can be pumped, which has acceptable solids suspension and which has low fluid loss at temperatures up to 400° F. The dry hydraulic cement composition of this invention is comprised of hydraulic cement and the fluid loss additive of this invention. The dry composition can also include various other additives including dispersants, suspension agents, strength stabilizing agents, set time retarders, set time retarder intensifiers and defoamers.

The term "hydraulic cement" includes compounds of a cementitious nature which set in the presence of water. Such compounds include, for example, Portland Cement, in general, and particularly Portland Cement of API Classes G and H, although other API classes can be used. Other useful hydraulic cements include pozzolan cements, gypsum cements, high alumina content cements, slag cements, high gel cements, silicate cements, ultrafine cements and high alkalinity cements. Portland cements, and particularly API Classes G and H, are preferred.

The fluid loss additive of this invention, which is made as above described, is present in the cementing composition of this invention in an amount in the range of from about 0.1 to about 2.0 and preferably from about 0.3 to about 0.7 pounds of fluid loss additive per 100 pounds of hydraulic cement.

A set time retarder can be employed as an additive when the bottom hole circulating temperature exceeds 100 degrees F. Examples of retarders which can be used include lignosulfonates, such as calcium lignosulfonate and sodium lignosulfonate. A set time retarder can be present in the cementing composition in an amount in the range of from about 0 to about 3.0 and preferably from about 0.15 to about 1.5 pounds of set time retarder per 100 pounds of hydraulic cement.

The function of a set time retarder can be enhanced by a cement set time retarder intensifier, examples of which include organic acids and salts thereof. Examples of such acids include citric acid, tartaric acid, gluconic acid and mixtures thereof. A set time retarder intensifier can be present in the cementing composition in an amount in the range of from about 0 to about 1.5 pounds of set time retarder intensifier per 100 pounds of hydraulic cement.

A strength stabilizing agent can be employed as an additive in the cementing composition of this invention. Examples of strength stabilizing agents which can be used include silica flour and silica sand. A strength stabilizing agent can be present in the cementing composition in an amount in the range of from about 0 to about 100 and preferably about 35 pounds of strength stabilizing agent per 100 pounds of hydraulic cement.

A dispersant can be employed as an additive in the cementing composition of this invention. Naphthalene sulfonate is an example of a material which can be used as a dispersant. Lignosulfonates, can also function as dispersants. A dispersant can be present in the cementing composition in an amount in the range of from about 0 to about 1.0 pound of dispersant per 100 pounds of hydraulic cement.

A suspension agent can be employed in the cement composition to help maintain a uniform dispersion of solid particles in the slurry of cement composition in water during pumping and setting. Examples of suspension agents include bentonite, water soluble polymers, cellulose derivatives, silicates, welan gum, diutan gum and mixtures of welan and/or diutan with silica flour. A suspension agent can be present in the cementing composition in an amount in the range of from about 0 to about 8.0 pounds of suspension agent per 100 pounds of hydraulic cement.

The cement composition may also include foaming agents or defoaming agents which comprise various anionic, cationic, nonionic or other surface active compounds. One specific surface active agent which can be employed herein as a defoaming agent is polypropylene glycol. The amount of surface active agent can be present in the range of from about 0 to about 3 and preferably from about 0.1 to about 0.3 pounds of surface active agent per 100 pounds of cement.

3. Slurry of Hydraulic Cement Composition in Water

The above described dry ingredients are mixed to form the hydraulic cement composition of this invention which can be stored for later use. The dry resulting composition is combined with water to form a pumpable slurry. The amount of water used to mix with the dry composition to make the slurry can be expressed as pounds of water per 100 pounds of cement and also as pounds of water per 100 pounds of dry composition. Accordingly, the amount of water present in the slurry is an amount in the range of from about 32 to about 125 and preferably from about 38 to about 52 pounds of water per 100 pounds of cement. Alternatively, the amount of water present in the slurry is an amount in the range of from about 24 to about 45 pounds of water per 100 pounds of dry cement composition.

Water used to make the slurry can include a dissolved inorganic salt, such as sodium chloride, in an amount of up to about 38 pounds of sodium chloride per 100 pounds of water.

EXAMPLES

Co-polymer compositions were prepared with ingredients which are identified in Table A.

TABLE A

| Item | Ingredient | Definition | Function | Molecular Weight |
|---|---|---|---|---|
| 1 | D.I. Water | de-ionized water | diluent, reaction medium | 18.01 |
| 2 | NaOH | sodium hydroxide, 50% aqueous solution | base neutralizer | 40.00 |
| 3 | K Humate | potassium humate, 12% active | molecular weight control | 258.35 |
| 4 | ATBS | 2-acrylamido-2-methyl-propanesulfonic acid, 50% aqueous solution (sodium salt) | monomer reactant | 229.23 |
| 5 | NNDMA | N,N-dimethylacrylamide | monomer reactant | 99.13 |
| 6 | ACMO | acryloylmorpholine | monomer reactant | 141.17 |
| 7 | ACR | acrylamide | monomer reactant | 71.08 |
| 8 | MAA | maleic anhydride | monomer reactant | 98.06 |
| 9 | TEPA | tetraethylenepentamine | chain transfer agent | 189.3 |
| 10 | SP | sodium persulfate | polymerization initiator | 238.1 |
| 11 | Caustic soda | sodium hydroxide | pH adjustment | 40.00 |

Example 1

Co-polymer compositions were prepared. A reaction vessel having a suitable capacity and being equipped with a mechanical stirrer and a thermometer was employed to prepare each composition. The ingredients employed are defined in Table A and the quantities of each ingredient used to prepare each composition are set forth in Tables 1.1, 1.2 and 1.3.

TABLE 1.1

Fluid Loss Additive Composition 1 (FLA 1)

| ITEM | INGREDIENT | QUANTITY grams | WEIGHT percent | MOLES (active) | MOLE percent (active) | MOLES ATBS PER MOLE |
|---|---|---|---|---|---|---|
| 1 | D.I. Water | 92,898.80 | 51.61 | | 0.000 | |
| 2 | NaOH | 2,728.68 | 1.52 | | 0.000 | |
| 3 | K Humate | 9,905.75 | 5.50 | | 0.0000 | |
| 4 | ATBS | 58,908.78 | 32.73 | 128.49 | 59.3213 | 1.0000 |
| 5 | NNDMA | 7,043.92 | 3.91 | 71.06 | 32.8070 | 1.8082 |
| 6 | MAA | 1,672.34 | 0.93 | 17.05 | 7.8717 | 7.5361 |
| 7 | D.I. Water | 2,732.32 | 1.52 | | 0.0000 | |
| 8 | TEPA | 10.93 | 0.01 | | 0.0000 | |
| 9 | D.I. Water | 3,278.78 | 1.82 | | 0.0000 | |
| 10 | SP | 819.70 | 0.46 | | 0.0000 | |
| Totals | | 180,000.00 | 100.00 | 216.60 | 100.0000 | |

Experimental Procedure for Making FLA 1

Items 1, 2 and 3 of Table 1.1 were added, in sequence, to the reaction vessel. The stirrer was activated and the contents of the vessel were stirred for five minutes. Thereafter, ingredients 4, 5 and 6 were added, in sequence, to the vessel while stirring continued. Stirring continued until all solids were dissolved. The pH of the solution was adjusted to a value of 9 with caustic soda. Stirring continued and the contents of the vessel were heated to 114° F. in a water bath. Thereafter items 7, 8, 9 and 10 were added to the vessel. The temperature of the contents of the vessel increased. The temperature of the water bath was adjusted to 140° F. and maintained at that level for 2 hours while stirring continued.

The reaction mass was dried to produce a solid product. The drying process included the steps of pumping the liquid reaction mass onto the rollers of a drum dryer which had been heated by steam to a temperature equal to the boiling point of water. Liquid in the reaction mass evaporated to thereby form a dry polymer product on the rollers of the drum. The dried polymer product was scraped off of the rollers to form flakes which were then milled to a powder. The powder was subsequently employed as a fluid loss additive as hereinafter described.

TABLE 1.2

Fluid Loss Additive Composition 2 (FLA 2)

| ITEM | INGRE-DIENT | QUAN-TITY pounds | WEIGHT percent | MOLES (active) | MOLE percent (active) | MOLES ATBS PER MOLE |
|---|---|---|---|---|---|---|
| 1 | D.I. Water | 820.12 | 50.24 | | | |
| 2 | K Humate | 168.80 | 10.34 | | | |
| 3 | ATBS | 499.53 | 30.60 | 1.090 | 53.2487 | 1.0000 |
| 4 | ACMO | 35.59 | 2.18 | 0.252 | 12.3107 | 4.3254 |
| 5 | ACR | 50.12 | 3.07 | 0.705 | 34.4406 | 1.5461 |
| 6 | D.I. Water | 24.13 | 1.48 | | | |
| 7 | TEPA | 0.37 | 0.02 | | | |
| 8 | D.I. Water | 28.96 | 1.77 | | | |
| 9 | SP | 4.90 | 0.30 | | | |
| Totals | | 1632.50 | 100.00 | 2.047 | 100.000 | |

Experimental Procedure for Making FLA 2

Items 1 and 2 of Table 1.2 were added, in sequence, to the reaction vessel. The stirrer was activated and the contents of the vessel were stirred for five minutes. Thereafter, ingredients 3, 4 and 5 were added, in sequence, to the vessel while stirring continued. Stirring continued until all solids were dissolved. The pH of the solution was adjusted to a value of 9 with caustic soda. Stirring continued and the contents of the vessel were purged with nitrogen and heated to 114° F. in a water bath. Thereafter items 6, 7, 8 and 9 were added to the vessel. The temperature of the contents of the vessel increased. The temperature of the water bath was adjusted to 140° F. and maintained at that level for 2 hours while stirring continued.

The reaction mass was dried to produce a solid product. The drying process included the steps of pumping the liquid reaction mass onto the rollers of a drum dryer which had been heated by steam to a temperature equal to the boiling point of water. Liquid in the reaction mass evaporated to thereby form a dry polymer product on the rollers of the drum. The dried polymer product was scraped off of the rollers to form flakes which were then milled to a powder. The powder was subsequently employed as a fluid loss additive as hereinafter described.

TABLE 1.3

Fluid Loss Additive Composition 3 (FLA 3)

| ITEM | INGRE-DIENT | QUAN-TITY grams | WEIGHT percent | MOLES (active) | MOLE percent (active) | MOLE ATBS PER MOLE |
|---|---|---|---|---|---|---|
| 1 | D.I. Water | 1369.63 | 48.92 | | | |
| 2 | NaOH | 40.32 | 1.44 | | | |
| 3 | K Humate | 292.04 | 10.43 | | | |
| 4 | ATBS | 868.46 | 31.02 | 1.894 | 59.312 | 1.0000 |
| 5 | NNDMA | 103.88 | 3.71 | 1.048 | 32.819 | 1.8073 |
| 6 | MAA | 24.64 | 0.88 | 0.251 | 7.870 | 7.5368 |
| 7 | D.I. Water | 40.29 | 1.44 | | | |
| 8 | TEPA | 0.17 | 0.01 | | | |
| 9 | D.I. Water | 48.40 | 1.73 | | | |
| 10 | SP | 12.04 | 0.43 | | | |
| Totals | | 2799.87 | 100.00 | 3.193 | 100.000 | |

Experimental Procedure for Making FLA 3

Items 1, 2 and 3 of Table 1.3 were added, in sequence, to the reaction vessel. The stirrer was activated and the contents of the vessel were stirred for five minutes. Thereafter, ingredients 4, 5 and 6 were added, in sequence, to the vessel while stirring continued. Stirring continued until all solids were dissolved. The pH of the solution was adjusted to a value of 9 with caustic soda. Stirring continued and the contents of the vessel were heated to 114° F. in a water bath. Thereafter items 7, 8, 9 and 10 were added to the vessel. The temperature of the contents of the vessel increased. The temperature of the water bath was adjusted to 140° F. and maintained at that level for 2 hours while stirring continued.

The reaction mass was dried to produce a solid product. The drying process included the steps of pumping the liquid reaction mass onto the rollers of a drum dryer which had been heated by steam to a temperature equal to the boiling point of water. Liquid in the reaction mass evaporated to thereby form a dry polymer product on the rollers of the drum. The dried polymer product was scraped off of the rollers to form flakes which were then milled to a powder. The powder was subsequently employed as a fluid loss additive as hereinafter described.

Cementing compositions were prepared with ingredients which are identified in Table B.

TABLE B

| Ingredient | Chemical Definition | Function |
|---|---|---|
| Class H cement | Hydraulic cement API Spec. 10 | basic well cement for use from surface to 8000 feet |
| Class G cement | Hydraulic cement API Spec. 10 | basic well cement for use from surface to 8000 feet |
| SSA-1 | Silica flour | strength stabilizing agent |
| SSA-2 | Silica sand | strength stabilizing agent |
| CLS | Calcium lignosulfonate | cement set time retarder |
| TTA | Tartaric acid | cement set time retarder intensifier |
| SG | Sodium gluconate | cement set time retarder intensifier |
| SA | Dry blend, 80 wt. parts diutan gum, 240 wt. parts silica flour | suspension agent |
| DSP | Naphthalene sulfonate | dispersant |
| NaCl | Sodium chloride | increase salt content of water |
| DFMR | Polypropylene glycol | defoamer |
| FLA | See Tables 1, 2 and 3 | fluid loss additive |

Example 2

Cementing slurries were prepared by mixing water with dry ingredients. The dry ingredients, water and the quantities of each are set forth in Tables 2.1, 2.2, 2.3, 2.4 and 2.5.

TABLE 2.1

| | CEMENT COMPOSITION grams | | | | | | |
|---|---|---|---|---|---|---|---|
| INGREDIENT | 1 | 2 | 3 | 4 | 5 | 6 | 7 |
| Cement Class H | 600.00 | 600.00 | 600.00 | 600.00 | 600.00 | 600.00 | 600.00 |
| SSA -1 | | | 210.00 | 210.00 | 210.00 | 210.00 | 210.00 |
| SSA -2 | 210.00 | 210.00 | | | | | |
| FLA 1 | 1.80 | | | 1.80 | 3.00 | 4.20 | |
| FLA 2 | | 1.80 | 1.80 | | | | 4.20 |
| CLS | 7.20 | 7.20 | 7.20 | 7.20 | 7.20 | 7.20 | 7.20 |
| TTA | 3.60 | 3.60 | 3.60 | 3.60 | 3.60 | 3.60 | 3.60 |
| SA | 0.60 | 0.60 | 0.90 | 0.60 | 0.60 | 0.60 | 0.90 |
| TOTAL dry ingredients | 823.20 | 823.20 | 823.50 | 823.20 | 824.40 | 825.60 | 825.90 |
| D.I. Water | 228.00 | 228.00 | 313.83 | 313.83 | 313.83 | 313.83 | 313.83 |
| TOTAL slurry ingredients | 1051.20 | 1051.20 | 1137.33 | 1137.03 | 1138.23 | 1139.43 | 1139.73 |

TABLE 2.2

| | CEMENT COMPOSITION grams | | | | | | |
|---|---|---|---|---|---|---|---|
| INGREDIENT | 8 | 9 | 10 | 11 | 12 | 13 | 14 |
| Cement Class H | 850.00 | 850.00 | 850.00 | 850.00 | 850.00 | 850.00 | 850.00 |
| FLA 1 | 2.55 | 2.55 | 2.55 | 2.55 | | 2.55 | |
| FLA 2 | | | | | 2.55 | | 2.55 |
| DSP | | 4.25 | 3.40 | 2.13 | 2.13 | 4.25 | 4.25 |
| CLS | 1.70 | 1.28 | 1.28 | 1.28 | 1.28 | 1.28 | 1.28 |
| SA | 0.85 | 0.85 | | | | | |
| TOTAL dry ingredients | 854.25 | 858.08 | 857.23 | 855.96 | 855.96 | 858.93 | 858.93 |
| D.I. Water | 324.02 | 324.02 | 324.02 | 324.02 | 324.02 | 324.02 | 324.02 |
| TOTAL slurry ingredients | 1178.27 | 1182.10 | 1181.25 | 1179.98 | 1179.98 | 1182.95 | 1182.95 |

TABLE 2.3

| | CEMENT COMPOSITION grams | | |
|---|---|---|---|
| INGREDIENT | 15 | 16 | 17 |
| Cement Class H | 850.00 | 850.00 | 850.00 |
| FLA 1 | 2.89 | | |
| FLA 2 | | 2.89 | 2.89 |
| SA | | | 0.43 |
| TOTAL dry ingredients | 852.89 | 852.89 | 853.32 |
| D.I. Water | 324.02 | 324.02 | 324.02 |
| TOTAL slurry ingredients | 1176.91 | 1176.91 | 1177.34 |

TABLE 2.4

| | CEMENT COMPOSITION grams | | | | | |
|---|---|---|---|---|---|---|
| INGREDIENT | 18 | 19 | 20 | 21 | 22 | 23 |
| Cement Class H | 600.00 | 600.00 | | | 600.00 | 600.00 |
| Cement Class G | | | 600.00 | 600.00 | | |
| SSA -2 | 210.00 | 210.00 | 210.00 | 210.00 | 210.00 | 210.00 |
| FLA 3 | 0.00 | 1.80 | 1.80 | 3.00 | 3.00 | 1.80 |
| CLS | 7.20 | 7.20 | 7.20 | 7.20 | 7.20 | 7.20 |
| TTA | 3.60 | 3.60 | 3.60 | 3.60 | 3.60 | 3.60 |
| SA | 1.20 | 1.20 | 1.20 | 1.20 | 1.20 | 1.20 |
| NaCl | | | | | 41.04 | 84.70 |
| DFMR | | | | | 0.60 | 0.60 |
| TOTAL dry ingredients | 822.00 | 823.80 | 823.80 | 825.00 | 866.64 | 909.10 |
| D.I. Water | 228.00 | 228.00 | 264.00 | 264.00 | 228.00 | 228.00 |
| TOTAL slurry ingredients | 1050.00 | 1051.80 | 1087.80 | 1089.00 | 1094.64 | 1137.10 |

TABLE 2.5

| | CEMENT COMPOSITION grams | | | | |
|---|---|---|---|---|---|
| INGREDIENT | 24 | 25 | 26 | 27 | 28 |
| Cement Class H | 600.00 | 850.00 | 850.00 | 640.00 | 640.00 |
| SSA-2 | 210.00 | | | | |
| SSA-1 | | | | 224.00 | 224.00 |
| FLA 1 | | | | 3.20 | 5.12 |
| FLA 2 | 3.00 | 4.25 | 4.25 | | |
| DSP | | 4.25 | | | |
| CLS | 7.20 | 1.28 | | 3.36 | 3.36 |
| TTA | 3.60 | | | | |
| SG | | | | 1.12 | 1.12 |
| SA | 0.60 | 0.85 | | | |
| TOTAL dry ingredients | 824.40 | 860.63 | 854.25 | 871.68 | 873.60 |
| D.I. Water | 228.00 | 324.02 | 324.02 | 307.52 | 307.52 |
| TOTAL slurry ingredients | 1052.40 | 1184.65 | 1178.27 | 1179.20 | 1181.12 |

Example 3

Fluid loss and rheology tests were conducted on the hydraulic cement slurries described in Tables 2.1, 2.2, 2.3, 2.4 and 2.5.

Fluid Loss Test . . . Experimental Procedure

An Atmospheric Consistometer Model 1200, available from OFI Testing Equipment, Inc., of Houston, Tex., comprising a fluid loss jacket and a fluid loss cell were preheated to the required temperature. The required temperatures are specified in Tables 3.1, 3.2 and 3.3.

Slurry Preparation

A weighed quantity of each dry ingredient to be included in a cement composition to be tested was placed in a dry container. The container was closed. The dry contents of the container were uniformly blended by rotating the closed container for about 45 seconds. The temperature of the blended dry ingredients was about 73 degrees F. The identities and quantities of the dry ingredients placed in the container for blending are provided in Tables 2.1, 2.2, 2.3, 2.4 and 2.5.

A weighed quantity of D.I, water to be included in a cement composition to be tested was placed in the container of an OFITE Model 20 constant speed blender available from OFI Testing Equipment, Inc., of Houston, Tex. The temperature of the D.I. water placed in the container was about 73 degrees F. The quantity of water for each composition tested is provided in Tables 2.1, 2.2, 2.3, 2.4 and 2.5.

The container of water was placed on the base of the constant speed blender. The blender was activated and operated at a speed of 4000 rpm. As soon as the blender was activated the blended dry ingredients were added to the water in the container at an even pour rate. The entire amount of blended ingredients were added to the water within about 15 seconds.

The mixing speed of the blender was increased to 12000 rpm, and the contents of the container were mixed for 35 seconds. During the 35 second mixing period the interior of the container was scraped to ensure that the entire contents of the container were mixed.

Mixing was terminated. The contents of the container, a slurry of cement composition in water, was ready for conditioning.

Slurry Conditioning

The prepared cement slurry was poured into the cup of the atmospheric consistometer to the depth of the mark fixed on the cup.

A clean, dry consistometer paddle was placed in the cup containing the slurry. The cup and paddle were then connected to the consistometer which had been preheated to the test temperature.

The slurry was conditioned for a period of 20 minutes by causing the cup to rotate at 150 rpm around the paddle which was connected to the consistometer by a torsion spring. The conditioning of the slurry was commenced within 1 minute of the completion of the preparation of the slurry. The initial consistency, as indicated by the consistometer dial, was recorded. The final consistency was recorded at the end of the 20 minute period.

Fluid Loss Tests Up to 200° F.

Fluid loss tests at temperatures less than the boiling point of water up to 200° F. were performed employing the OFITE HTHP filter press model 170-00-2 available from OH Testing Equipment, Inc., of Houston, Tex. The filter press consists of a nitrogen manifold, a high-pressure test cell having removable screens, a heating jacket, a manifold block and a suitable stand.

The nitrogen manifold included a primary pressure regulator and gauge, a nitrogen source pressure gauge, a back pressure regulator and gauge, and a manifold block which was connected to the primary pressure regulator. The test cell was comprised of a cylinder having an open top, an open bottom, a top cell cap, a top screen positioned below the top cell cap, a bottom cell cap, a bottom screen positioned above the bottom cell cap, an inlet valve stem connected to the manifold block and an outlet valve stem. An empty dry graduated cylinder was placed under the outlet valve stem at the bottom of the jacket.

The described press components were assembled with the top being left open. A cement slurry, having been conditioned no less than 6 minutes prior to testing and at the required temperature, was poured into the open top of the fluid loss cell. The top cell cap was fixed to the open top of the fluid loss cell after the slurry attained a level about 0.5 inches below the rim of the fluid loss cell.

The filled fluid loss cell was then placed in the pre-heated fluid loss jacket.

A nitrogen supply hose was attached to the hollow stem of the top cell cap which extended above the top of the jacket.

Nitrogen, at 1000 psi, was then admitted to the top cell cap via the nitrogen source on the nitrogen manifold and, simultaneously, the valve on the stem at the bottom of the jacket was opened and a timer was activated.

Fluid was forced by the pressured nitrogen out of the slurry through a 325 mesh screen and was collected in a cylinder. The quantity of fluid collected in the cylinder was recorded after 30 minutes, at which time the test was terminated.

The quantity of fluid collected was doubled. The result was reported as API Fluid Loss in cc per 30 minutes.

If the test sample is dehydrated before the elapse of 30 minutes or the test is terminated before the elapse of 30 minutes, then the fluid loss in 30 minutes, $Q_{30}$, is estimated by use of a formula provided in API RP 10B-2 as follows:

$$Q_{30} = Q_t * 5.447 / t^{1/2}$$

wherein $Q_{30}$ is the estimated quantity of fluid collected in 30 minutes $Q_t$ is the quantity of fluid collected in time t t is the time in minutes when the test ended In this instance the API fluid loss reported is the estimated value multiplied by two.

Fluid Loss Tests Greater than 200° F.

Fluid loss tests at temperatures greater than 200° F. were performed employing the OFITE Stirred Fluid Tester model 120-70 available from OH Testing Equipment, Inc., of Houston, Tex.

After the slurry was prepared, it was poured into the stirring fluid loss cell to a level just above the paddle. The lid on the cell was tightened and the cell was placed in the heating jacket and secured therein. The paddle was then actuated to stir the slurry at 150 rpm. Pressure at 500 psi was applied at the top of the cell and a thermocouple was inserted in the cell. The slurry in the cell was heated to the test temperature, 350° F., and, thereafter, maintained at that level. The slurry was stirred for an additional twenty minutes after the test temperature was obtained. Thereafter, stirring was terminated, the heating jacket (and cell) was repositioned, the pressure at the top of the cell was set at 1150 psi and the pressure at the bottom of the cell was set at 150 psi to thereby establish a differential of 1000 psi. The valve at the bottom of the cell was opened to permit release of the slurry which passed through a 325 mesh screen and a timer was started. Filtrate passing through the screen was collected in a suitable container. The test was terminated when about 100 cc of filtrate was collected. The collection time was then recorded. The quantity of filtrate was then multiplied by a factor of two.

If the test sample is dehydrated before the elapse of 30 minutes or the test is terminated before the elapse of 30 minutes, then the fluid loss in 30 minutes, $Q_{30}$, is estimated by use of a formula provided in API RP 10B-2 as follows:

$$Q_{30}=Q_t*5.447/t^{1/2}$$

wherein $Q_{30}$ is the estimated quantity of fluid collected in 30 minutes $Q_t$ is the quantity of fluid collected in time t t is the time in minutes when the test ended In this instance the API fluid loss reported is the estimated value multiplied by two.

Fluid Loss Test Results

Table 3.1 contains results of fluid loss tests conducted on 26 cementing compositions. Compositions 1-17 and 19-26 did contain a fluid loss additive. Composition 18 did not contain a fluid loss additive. The fluid loss additives included in the cementing compositions are described in Tables 1.1, 1.2 and 1.3. The fluid loss tests were conducted at three test temperatures, specifically, 350° F., 180° F. and 80° F.

TABLE 3.1

| Table | Cement Comp. | API Fluid Loss cc/30 min 350° F. | 180° F. | 80° F. | Fluid loss Additive percent by weight of cement FLA 1 | FLA 2 | FLA 3 | 0 |
|---|---|---|---|---|---|---|---|---|
| 2.5 | 26 | | | 37 | | 0.5 | | |
| 2.3 | 15 | | | 40 | 0.34 | | | |
| 2.3 | 16 | | | 53 | | 0.34 | | |
| 2.4 | 22 | | 53 | | | | 0.5 | |
| 2.4 | 20 | | 62 | | | | 0.3 | |
| 2.1 | 6 | 68 | | | 0.7 | | | |
| 2.4 | 21 | 70 | | | | | 0.5 | |

TABLE 3.1-continued

| Table | Cement Comp. | API Fluid Loss cc/30 min 350° F. | 180° F. | 80° F. | Fluid loss Additive percent by weight of cement FLA 1 | FLA 2 | FLA 3 | 0 |
|---|---|---|---|---|---|---|---|---|
| 2.4 | 22 | 70 | | | | | 0.5 | |
| 2.2 | 9 | | 73 | | 0.3 | | | |
| 2.3 | 17 | | | 78 | | 0.34 | | |
| 2.5 | 25 | | 78 | | | 0.5 | | |
| 2.4 | 19 | | 80 | | | | 0.3 | |
| 2.4 | 19 | 81 | | | | | 0.3 | |
| 2.4 | 19 | 84 | | | | | 0.3 | |
| 2.1 | 7 | 88 | | | 0.7 | | | |
| 2.2 | 13 | | 88 | | 0.3 | | | |
| 2.1 | 1 | 90 | | | 0.3 | | | |
| 2.5 | 24 | 91 | | | | 0.5 | | |
| 2.2 | 10 | | 94 | | 0.3 | | | |
| 2.1 | 5 | 105 | | | 0.5 | | | |
| 2.2 | 14 | | 123 | | 0.3 | | | |
| 2.4 | 20 | 151 | | | | | 0.3 | |
| 2.1 | 2 | 159 | | | 0.3 | | | |
| 2.1 | 4 | 161 | | | 0.3 | | | |
| 2.2 | 11 | | 183 | | 0.3 | | | |
| 2.4 | 23 | | 221 | | | | 0.3 | |
| 2.2 | 12 | | 241 | | | 0.3 | | |
| 2.2 | 8 | | 267 | | 0.3 | | | |
| 2.1 | 3 | 277 | | | | 0.3 | | |
| 2.4 | 18 | | 960 | | | | | 0.0 |

Test Temperature 350° F.

The loss of fluid from cementing compositions maintained at a temperature of 350° F. was determined for compositions 1-7 (Table 2.1), compositions 19-22 (Table 2.4) and composition 24 (Table 2.5).

Compositions 1, 4, 5 and 6 contained fluid loss additive 1 (FLA-1, Table 1.1).

Composition 1, having a fluid loss additive quantity of 1.80 grams (0.3% by weight of cement), experienced a fluid loss of 90 cc per 30 minutes. Composition 4, also having a fluid loss additive quantity of 1.80 (0.3% by weight of cement), experienced a fluid loss of 161 cc per 30 minutes. The difference between compositions 1 and 4 was the use of silica sand in composition 1 versus the use of silica flour in composition 4, together with consequent increase in water requirement for silica flour.

Composition 5, having a fluid loss additive quantity of 3.00 grams (0.5% by weight of cement), experienced a fluid loss of 105 cc per 30 minutes. Composition 6, having a fluid loss additive quantity of 4.20 grams (0.7% by weight of cement), experienced a fluid loss of 68 cc per 30 minutes. The difference between compositions 4, 5 and 6 was the quantity of fluid loss additive. These data illustrate that increase in quantity of fluid loss additive, with all other parameters remaining constant, produces a decrease in fluid loss.

Compositions 2, 3 and 7 contained fluid loss additive 2 (FLA-2, Table 1.2).

Composition 2, having a fluid loss additive quantity of 1.8 grams (0.3% by weight of cement), experienced a fluid loss of 159 cc per 30 minutes. Composition 3, also having a fluid loss additive quantity of 1.8 grams (0.3% by weight of cement), experienced a fluid loss of 277 cc per 30 minutes. The difference between compositions 2 and 3 was the use of silica sand in composition 2 versus the use of silica flour in composition 3, together with consequent increase in water requirement for silica flour.

The difference between compositions 1 and 2 was the use of FLA-1 in composition 1 versus the use of FLA-2 in composition 2. The composition containing FLA-1 produced lower fluid loss than the composition containing FLA-2.

Composition 7, having a fluid loss additive quantity of 4.2 grams (0.7% by weight of cement) experienced a fluid loss of 88 cc per 30 minutes. The difference between compositions 3 and 7 was the quantity of fluid loss additive. These data illustrate that increase in the quantity of fluid loss additive, with all other parameters remaining constant, produces a decrease in fluid loss.

The difference between compositions 6 and 7 was the use of FLA-1 in composition 6 versus the use of FLA-2 in composition 7. The composition containing FLA-1 produced lower fluid loss than the composition containing FLA-2.

Compositions 19, 20, 21 and 22 contained fluid loss additive 3 (FLA-3, Table 1.3).

Composition 19, having a fluid loss additive quantity of 1.80 (0.3% by weight of cement), experienced a fluid loss of 81 and 84 cc per 30 minutes. Composition 20, having a fluid loss additive quantity of 1.80 grams (0.3% by weight of cement, experienced a fluid loss of 151 cc per 30 minutes. The difference between compositions 19 and 20 was the use of Class H cement in composition 19 and the use of Class G cement in composition 20, together with consequent increase in water requirement for use of Class G cement. The composition containing Class H cement produced lower fluid loss than the composition containing Class G cement.

Compositions 21 and 22, each had a fluid loss additive content of 3.00 grams (0.5% by weight of cement), and each experienced a fluid loss of 70 cc per 30 minutes. Compositions 21 and 22 displayed various differences. Composition 21 contained Class G cement and 264 grams of water. Composition 22 contained Class H cement, 228 grams of water, 41.04 grams of NaCl (18% by weight of water) and 0.6 grams of defoamer. These data illustrate that identical fluid loss can be obtained in salt water as can be obtained in D.I. water.

The difference between compositions 20 and 21 was the quantity of fluid loss additive. These data illustrate that increase in quantity of fluid loss additive, with all other parameters remaining constant, produces a decrease in fluid loss.

Composition 24, having a fluid loss additive quantity of 3.0 grams (0.5% by weight of cement), experienced a fluid loss of 91 cc per 30 minutes. The difference between composition 2 and composition 24 was the quantity of fluid loss additive. These data illustrate that increase in the quantity of fluid loss additive, with all other parameters remaining constant, produces a decrease in fluid loss.

Test Temperature 180° F.

The loss of fluid from cementing compositions maintained at a temperature of 180° F. was determined for compositions 8, 9, 10, 11, 12, 13 and 14 (Table 2.2), compositions 18, 19, 20, 22 and 23 (Table 2.4) and composition 25 (Table 2.5).

Compositions 8, 9, 10, 11 and 13 each contained 2.55 grams (0.3% by weight of cement) of FLA-1 (Table 1.1). Composition 9 experienced a fluid loss of 73 cc per 30 minutes. Composition 13 experienced a fluid loss of 88 cc per 30 minutes. Composition 10 experienced a fluid loss of 94 cc per 30 minutes. Composition 11 experienced a fluid loss of 183 cc per 30 minutes. Composition 8 experienced a fluid loss of 267 cc per 30 minutes. In general, the fluid loss experienced for each of compositions 8, 9, 10, 11 and 13 increased with decrease in dispersant (Table B). Compositions 9 and 13 each contained the same quantity of dispersant, but composition 13 contained a suspension agent while composition 9 did not include a suspension agent (Table B). Composition 25 contained 4.25 grams (0.5% by weight of cement) of FLA-2 (Table 1.2) and experienced a fluid loss of 78 cc per 30 minutes.

Composition 8 experienced the highest fluid loss. Composition 8 contained no dispersant, no suspension agent and a quantity of set time retarder greater than the quantity employed in compositions 9, 10, 11 and 13.

Compositions 12 and 14 each contained 2.55 grams (0.3% by weight of cement) of FLA-2 (Table 1.2). Composition 14 experienced a fluid loss of 123 cc per 30 minutes. Composition 12 experienced a fluid loss of 241 cc per 30 minutes. The fluid loss experienced for compositions 12 and 14 increased with decrease in dispersant (Table B).

The difference between compositions 11 and 12 resided in the presence of FLA-1 in composition 11 and FLA-2 in composition 12. The fluid loss experienced for composition 11 was less than that experienced for composition 12. Accordingly, the composition containing FLA-1 produced lower fluid loss than the composition containing FLA-2.

The difference between compositions 14 and 25 was the quantity of fluid loss additive. These data illustrate that increase in the quantity of fluid loss additive, with all other parameters remaining constant, produces a decrease in fluid loss.

Compositions 19, 20, 22 and 23 contained fluid loss additive 3 (FLA-3, Table 1.3). Compositions 19, 20 and 23 each contained 1.80 grams (0.3% by weight of cement) of fluid loss additive. Composition 22 contained 3.00 grams (0.5% by weight of cement) of FLA-3 (Table 1.3). Composition 19 experienced a fluid loss of 80 cc per 30 minutes. Composition 20 experienced a fluid loss of 62 cc per 30 minutes. Composition 23 experienced a fluid loss of 221 cc per 30 minutes. Composition 22 experienced a fluid loss of 53 cc per 30 minutes.

The difference between compositions 19 and 20 was the use of Class H cement in composition 19 and the use of Class G cement in composition 20 and an increase in water content. Composition 19, containing Class H cement, produced higher fluid loss than composition 20, containing Class G cement.

The difference between compositions 20 and 23 was the use in composition 23 of Class H cement, 84.7 grams of NaCl (37.15% by weight of water) and 0.6 grams of defoamer, and the use in composition 20 of Class G cement and an increase in water content. Composition 23, containing Class H cement, salt and defoamer, produced higher fluid loss than composition 20, containing Class G cement but no salt and no defoamer.

The difference between compositions 19 and 23 was the use in composition 23 of 84.7 grams of NaCl (37.15% by weight of water) and 0.6 grams of defoamer. Composition 19 produced lower fluid loss than composition 23.

The difference between compositions 19 and 22 was the use in composition 22 of 3.0 grams of FLA-3 (0.5% by weight of cement), 41.04 grams of NaCl (18% by weight of water) and 0.6 grams of defoamer. Composition 19 produced higher fluid loss than composition 22. More fluid loss additive in composition 22 produced lower fluid loss.

Test Temperature 80° F.

The loss of fluid from cementing compositions maintained at a temperature of 80° F. was determined for compositions 15, 16 and 17 (Table 2.3) and composition 26 (Table 2.5).

Composition 15 contained 2.89 grams (0.34% by weight of cement) of fluid loss additive 1 (FLA-1, Table 1.1). Composition 15 experienced a fluid loss of 40 cc per 30 minutes.

Each of compositions 16 and 17 contained 2.89 grams (0.34% by weight of cement) of fluid loss additive 2 (FLA-2, Table 1.2). Composition 26 contained 4.25 grams (0.5% by weight of cement) of fluid loss additive 2 (FLA-2, Table 1.2). Composition 16 experienced a fluid loss of 53 cc per 30 minutes. Composition 17 experienced a fluid loss of 78 cc per 30 minutes. Composition 26 experienced a fluid loss of 37 cc per 30 minutes.

Composition 15, containing FLA-1, produced lower fluid loss than compositions 16 and 17 each of which contained FLA-2. Furthermore, composition 17, which also contained a suspension agent, produced a higher fluid loss than composition 16 which did not contain a suspension agent.

The difference between compositions 16 and 26 was the quantity of fluid loss additive. These data illustrate that increase in the quantity of fluid loss additive, with all other parameters remaining constant, produces a decrease in fluid loss.

Fluid Properties (Rheology) Tests . . . Experimental Procedure

Cement slurries were prepared and conditioned as previously described in connection with the above described Fluid Loss Tests.

The elapsed time between completion of slurry conditioning and rheology testing was less than 1 minute.

The conditioned slurry was processed in an OFITE Model 800 viscometer available from OH Testing Equipment; Inc., of Houston, Tex., wherein the slurry was poured into the cup of the viscometer to depth of the mark fixed on the cup.

The filled viscometer cup was placed on the viscometer platform and raised to the prescribed level on the sleeve attached to the viscometer. The sleeve was caused to rotate around the bob at 300 rpm for 60 seconds before the first dial reading was recorded.

Additional rotational measurements were taken in the order of 200 rpm, 100 rpm, 6 rpm and 3 rpm. Each additional rotation extended for 20 seconds. Dial readings after each 20 second rotation were recorded.

Fluid Properties Test Results Table 3.2

Table 3.2 contains results of fluid properties tests conducted on 15 cementing compositions.

Rheology tests were conducted on compositions 1, 2 and 6 (Table 2.1); compositions 8, 9, 10, 11, 12, 13 and 14 (Table 2.2); and compositions 18, 19, 20, 22 and 23 (Table 2.4). The tests were conducted at a temperature of 180° F.

Compositions 1, 6, 8, 9, 10, 11 and 13 contained fluid loss additive 1 (FLA 1, Table 1.1). Composition 2, 12 and 14 contained fluid loss additive 2 (FLA 2, Table 1.2). Compositions 19, 20, 22 and 23 contained fluid loss additive 3 (FLA 3, Table 1.3). Composition 18 did not contain a fluid loss additive.

Conditioning treatments were performed on compositions 1 and 2 (Table 2.1) and on compositions 8, 9, 10, 11, 12, 13 and 14 (Table 2.2).

All compositions tested, other than compositions 9, 10, 12 and 14, were classified as having "excellent" solids suspension properties. The compositions having the excellent rating all had rheology dial readings of at least 100 at 300 rpm.

Compositions 1, 6, 19 and 22 were each rated as having excellent solids suspension properties, and each experienced less than 100 cc fluid loss per 30 minutes at 350° F. In addition, each of these compositions contained a fluid loss additive copolymer in which maleic anhydride was included as a reactant. Also, composition 22 contained 18% NaCl by weight of water.

Fluid Properties Test Results Table 3.3

Table 3.3 contains results of fluid properties tests conducted on 3 cementing compositions.

Rheology tests were conducted on compositions 15, 16 and 17 (Table 2.3). The tests were conducted at a temperature of 80° F.

Composition 15 contained fluid loss additive 1 (FLA-1, Table 1.1). Compositions 16 and 17 contained fluid loss additive 2 (FLA-2, Table 1.2).

TABLE 3.3

| TABLE | COMP | FLA | Fluid Loss 80° F. | Rheology Data 80° F. rpm | | | | | Solids Suspension |
|---|---|---|---|---|---|---|---|---|---|
| | | | | 300 | 200 | 100 | 6 | 3 | |
| 2.3 | 15 | 1 | 40 | 148 | 103 | 55 | 5 | 3 | Good |
| 2.3 | 17 | 2 | 78 | 138 | 98 | 55 | 5.5 | 3.5 | Good |

TABLE 3.2

| TABLE | COMP. | FLA | Fluid Loss 350° F. | Fluid Loss 180° F. | Atmospheric Consistency ABc | | Rheology Data 180° F. rpm | | | | | Solids Suspension |
|---|---|---|---|---|---|---|---|---|---|---|---|---|
| | | | | | initial | 20 min | 300 | 200 | 100 | 6 | 3 | |
| 2.4 | 22 | 3 | 70 | 53 | 24 | 15 | 256 | 188 | 114 | 19 | 12 | Excellent |
| 2.4 | 19 | 3 | 84/81 | 80 | 21 | 15 | 253 | 187 | 116 | 22 | 14 | Excellent |
| 2.1 | 1 | 1 | 90 | | 21 | 16 | 221 | 161 | 94 | 11.5 | 7 | Excellent |
| 2.1 | 6 | 1 | 68 | | — | — | 214 | 153 | 86 | 9.5 | 5.5 | Excellent |
| 2.1 | 2 | 2 | 159 | | 15 | 9 | 176 | 124 | 72 | 9.5 | 5.5 | Excellent |
| 2.4 | 20 | 3 | 151 | 62 | 13 | 10 | 163 | 120 | 75 | 14 | 10 | Excellent |
| 2.2 | 8 | 1 | | 267 | 7 | 10 | 157 | 123 | 82 | 26 | 25 | Excellent |
| 2.4 | 23 | 3 | | 221 | 27 | 10 | 125 | 86 | 47 | 5 | 3 | — |
| 2.2 | 13 | 1 | | 88 | 10 | 9 | 120 | 87 | 52 | 8 | 5 | Excellent |
| 2.4 | 18 | — | | 960 | 14 | 10 | 111 | 81 | 53 | 16 | 12 | Excellent |
| 2.2 | 11 | 1 | | 183 | 6 | 6 | 102 | 74 | 44 | 8 | 8 | Excellent |
| 2.2 | 14 | 2 | | 123 | 9 | 8 | 87 | 62 | 37 | 5 | 3.5 | Acceptable |
| 2.2 | 10 | 1 | | 94 | 6 | 4 | 64 | 45 | 24 | 2.5 | 2 | Some Compacted Solids |
| 2.2 | 12 | 2 | | 241 | 6 | 4 | 61 | 41 | 22 | 2 | 1.5 | Settled Solids |
| 2.2 | 9 | 1 | | 73 | 6 | 5 | 59 | 41 | 22 | 2 | 1.5 | Compacted Solids |

TABLE 3.3-continued

| | | | Fluid Loss | Rheology Data 80° F. rpm | | | | | Solids |
|---|---|---|---|---|---|---|---|---|---|
| TABLE | COMP | FLA | 80° F. | 300 | 200 | 100 | 6 | 3 | Suspension |
| 2.3 | 16 | 2 | 53 | 108 | 74 | 39 | 2.5 | 2 | Compacted Solids |

Compositions 15 and 17 were classified as having "good" solids suspension properties. The compositions having the good rating all had rheology dial readings of at least 135 at 300 rpm.

Composition 15, having the lowest fluid loss and the highest rheology dial reading, contained a fluid loss additive copolymer in which maleic anhydride was included as a reactant.

Compositions 15 and 17 experienced similar suspension properties. The dial reading of composition 15 was higher than that for composition 17 (Table 3.3). The fluid loss additive in composition 15 did contain maleic anhydride, composition 17 did not contain maleic anhydride. The fluid loss experienced with composition 17 was greater than that for composition 15 (Table 3.1).

Each composition tested contained the same quantity of fluid loss additive, but neither of compositions 16 or 17 contained a fluid loss additive copolymer in which maleic anhydride was included as a reactant.

The difference between compositions 16 and 17 was the use in composition 17 of a suspension agent together with consequent increase in water requirement. Composition 16 experienced compacted solids.

Example 4

Hydraulic cementing compositions of this invention containing fluid loss additive composition 1 (Table 1.1) were tested to determine zero gel time and transition time.

The tests were performed by employing model 5265 SGSA static gel strength analyzer available from Chandler Engineering, of Broken Arrow, Okla. The results of the tests are provided in Table 4.

The cement slurries to be tested were prepared and then immediately treated in an atmospheric consistometer at 80° F. for 20 minutes. The methods of slurry preparation and conditioning are described above.

Immediately after conditioning, the gel strength developed by each slurry after 10 minutes was determined by permitting a portion of the slurry to remain static for 10 minutes and then, by using a rotational viscometer, recording the maximum deflection at 3 rpm followed by one minute of stirring at 300 rpm. The instrument dial reading, in lbs/100 ft², at the termination of the 300 rpm stirring was the initial gel strength in the SGSA test.

During the above mentioned 10 minute static period, the remaining portion of the conditioned slurry was poured into the cup of the SGSA cell to the appropriate level, the cell was filled with water and then closed.

The SGSA test was initiated at 80° F. and 3000 psi immediately following the conclusion of the above mentioned 10 minute static period. While maintaining pressure at 3000 psi the test temperature was maintained at 80° F. for the duration of the test period. In another test, the initial temperature of 80° F. was increased to 250° F. after 60 minutes and maintained at that temperature for the duration of the test. In another test, the initial temperature of 80° F. was increased to 350° F. after 75 minutes and maintained at that temperature for the duration of the test.

Zero gel time was calculated by the SGSA device. Transition time was the time required for gel strength to increase from 100 lb/100 ft² to 500 lb/100 ft².

TABLE 4

ZERO GEL TIME and TRANSITION TIME

| Cement Composition | FLA-1 pounds per 100 pounds dry cement | Test Temperature F.° | Zero Gel Time hours | Transition Time hours |
|---|---|---|---|---|
| 1 | 0.3 | 350 | 11.25 | 0.28 |
| 27 | 0.5 | 250 | 6.08 | 0.53 |
| 28 | 0.8 | 250 | 8.02 | 0.23 |
| 15 | 0.34 | 80 | 6.97 | 0.73 |

Composition 1 (Table 2.1) contained Class H cement, FLA-1 (Table 1.1), silica sand, a set time retarder, a retarder intensifier, and a suspension agent.

Compositions 27 and 28 (Table 2.5) each contained Class H cement, FLA-1, silica flour, a set time retarder, and a retarder intensifier. Composition 28 contained a greater amount of fluid loss additive than composition 27.

Composition 15 (Table 2.3) contained Class H cement and FLA-1.

Example 5

Method of Making Fluid Loss Additive Composition 4 (FLA 4)

TABLE 5

RECIPE

| ITEM | INGREDIENT | MOL WT | QUANTITY grams | WEIGHT percent | MOLES (active) | MOLE percent (active) | MOLES ATBS PER MOLE |
|---|---|---|---|---|---|---|---|
| 1 | D.I. WATER | 18.01 | 619.3253 | 51.6104 | 34.3879 | 90.0269 | |
| 2 | NaOH | 40.00 | 18.1914 | 1.5160 | 0.2274 | 0.5953 | |
| 3 | K Humate | 258.35 | 66.0383 | 5.5032 | 0.0307 | 0.0803 | |
| 4 | ATBS | 229.23 | 392.7251 | 32.7271 | 0.8566 | 2.2426 | 1.000 |
| 5 | ACMO | 141.17 | 46.9594 | 3.9133 | 0.3326 | 0.8709 | 2.575 |
| 6 | MAA | 98.06 | 11.1490 | 0.9291 | 0.1137 | 0.2977 | 7.534 |
| 7 | D.I WATER | 18.01 | 18.2155 | 1.5180 | 1.0114 | 2.6479 | |
| 8 | TEPA | 189.30 | 0.0729 | 0.0061 | 0.0004 | 0.0010 | |

TABLE 5-continued

RECIPE

| ITEM | INGREDIENT | MOL WT | QUANTITY grams | WEIGHT percent | MOLES (active) | MOLE percent (active) | MOLES ATBS PER MOLE |
|---|---|---|---|---|---|---|---|
| 9 | D.I WATER | 18.01 | 21.8585 | 1.8215 | .1.2137 | 3.1774 | |
| 10 | SP | 238.10 | 5.4646 | 0.4554 | 0.0230 | 0.0601 | |
| 11 | Totals | | 1200.0000 | 100.0000 | 38.1973 | 100.0000 | |

Table A includes information regarding ingredients.

Preparation Procedure

1. Combine recipe items 1, 2 and 3, in sequence, with stirring for about five minutes to form a first aqueous medium having items 1, 2 and 3 completely dispersed therein.
2. Add the monomer reactants, recipe items 4, 5 and 6, in sequence, with stirring to the first aqueous medium.
3. Continue stirring; after the monomer reactants are completely dissolved, add caustic soda to the first aqueous medium to adjust the pH thereof to a value of 9, to form a second aqueous medium.
4. Stir the second aqueous medium while increasing the temperature thereof to a value of 114° F.
5. Continue stirring; add TEPA, the chain transfer agent, and then SP, the polymerization agent, to the second aqueous medium at 114° F. to start the reaction.
6. Record temperature every 5 minutes until the temperature peaks.
7. Stop stirring; adjust the temperature of the reaction mass to 140° F. Maintain temperature for a period two hours.
8. Dilute the reaction mixture with D.I. water to produce a 10.16% by weight solution.

Example 6

Method of Making a Cementing Slurry Containing Fluid Loss Additive Composition 4 (FLA 4)

Recipe

TABLE B includes information regarding ingredients.

| ITEM | INGREDIENT | QUANTITY grams | CONCENTRATION based on weight of cement, % |
|---|---|---|---|
| 1 | Class H Cement | 600.00 | 100.00 |
| 2 | SSA-2 | 210.00 | 35.00 |
| 3 | FLA 4 (10.16% by weight aqueous solution) | 17.72 | 0.30 |
| 4 | CLS | 7.20 | 1.20 |
| 5 | TTA | 3.60 | 0.60 |
| 6 | SA | 0.60 | 0.10 |
| 7 | D.I. Water | 212.08 | 35.35 |
| TOTAL | | 1051.20 | |

Preparation Procedure

1. Place dry ingredients 1, 2, 4, 5 and 6 in a dry container. Close the container and uniformly blend the contents for about 45 seconds.
2. Place liquid ingredients 3 and 7 in the container of an OFITE Model 20 constant speed blender and activate the blender to operate at 4000 rpm.
3. Add the dry ingredients to the blender container at an even pour rate as soon as the blender is activated. Add the entire amount of dry ingredients (821.4 grams) to the blender within about 15 seconds.
4. Increase the blender speed to 12000 rpm, and mix the contents of the container for about 35 seconds to prepare the slurry. During the 35 second mixing period scrape the interior of the container to ensure that the entire contents of the container are mixed.

Example 7

Determination of API Fluid Loss of Slurry Prepared in Example 6

Test Temperature 350° F.

Procedure

The test procedure and equipment employed is described in the section entitled "Fluid Loss tests greater than 200° F.

The API Fluid Loss was determined to be 144 cc per 30 minutes.

The invention claimed is:

1. A cementing composition useful to form a sheath of hardened cement in the annular space between a well pipe disposed in a well bore and the walls of said well bore, said cementing composition being comprised of hydraulic cement and a water soluble fluid loss additive,
    said fluid loss additive is the reaction product of three monomers in an aqueous medium which includes water, a humate and sodium hydroxide, wherein said three monomers are:
    a sulfonic acid acrylic monomer, selected from the group consisting of 2-acrylamido-2-methylpropanesulphonic acid and the sodium and ammonium salts thereof;
    a vinylamide morpholine monomer, selected from the group consisting of acryloylmorpholine and methacryloylmorpholine; and
    an ethylene monomer, selected from maleic acid, fumaric acid, acrylic acid, sodium acrylate, itaconic acid and maleic anhydride;
    the mole ratio of said sulfonic acid acrylic monomer to said vinylamide morpholine monomer in said fluid loss additive is an amount in the range of from about 1.5 to about 2.7 moles of said sulfonic acid acrylic monomer per mole of said vinylamide morpholine monomer; and
    the mole ratio of said sulfonic acid acrylic monomer to said ethylene monomer in said fluid loss additive is an amount in the range of from about 4.8 to about 9.8 moles of said sulfonic acid acrylic monomer per mole of said ethylene monom.
2. The cementing composition of claim 1 wherein said fluid loss additive is present in said cementing composition in an amount in the range of from about 0.1 to about 2.0 pounds of said fluid loss additive per 100 pounds of said hydraulic cement.

3. The cementing composition of claim 2 further including additives selected from dispersants, suspension agents, strength stabilizing agents, set time retarders, set time retarder intensifiers, defoamers and mixtures thereof.

4. The cementing composition of claim 3 mixed with water to form a slurry of said cementing composition in said water, wherein said water is present in said slurry in an amount in the range of from about 32 to about 125 pounds of said water per 100 pounds of said hydraulic cement.

5. The cementing composition of claim 4 wherein said sulfonic acid acrylic monomer is the sodium salt of 2-acrylamido-2-methylpropanesulphonic acid, said vinylamide morpholine monomer is acryloylmorpholine, and said ethylene monomer is maleic anhydride.

6. The cementing composition of claim 2 mixed with water to form a slurry of said cementing composition in said water, wherein said water is present in said slurry in an amount in the range of from about 32 to about 125 pounds of said water per 100 pounds of said hydraulic cement.

7. The cementing composition of claim 2 wherein said sulfonic acid acrylic monomer is the sodium salt of 2-acrylamido-2-methylpropanesulphonic acid, said vinylamide morpholine monomer is acryloylmorpholine, and said ethylene monomer is maleic anhydride.

8. A cementing composition useful to form a sheath of hardened cement in the annular space between a well pipe disposed in a well bore and the walls of said well bore, said cementing composition being comprised of hydraulic cement and a water soluble fluid loss additive, said fluid loss additive is the reaction product of three monomers in an aqueous medium which includes water, a humate and sodium hydroxide, wherein said three monomers are the sodium salt of 2-acrylamido-2-methylpropanesulphonic acid, N,N-dimethylacrylamide, and maleic anhydride;

the mole ratio of said sodium salt of 2-acrylamido-2-methylpropanesulphonic acid to said N,N-dimethylacrylamide in said fluid loss additive is an amount in the range of from about 1.5 to about 2.7 moles of said sodium salt of 2-acrylamido-2-methylpropanesulphonic acid per mole of said N,N-dimethylacrylamide, the mole ratio of said sodium salt of 2-acrylamido-2-methylpropanesulphonic acid to said maleic anhydride in said fluid loss additive is an amount in the range of from about 4.8 to about 9.8 moles of said sodium salt of 2-acrylamido-2-methylpropanesulphonic acid per mole of said maleic anhydride; and said fluid loss additive is present in said cementing composition in an amount in the range of from about 0.1 to about 2.0 pounds of said fluid loss additive per 100 pounds of said hydraulic cement.

9. The cementing composition of claim 8 further including additives selected from dispersants, suspension agents, strength stabilizing agents, set time retarders, set time retarder intensifiers, defoamers and mixtures thereof.

10. The cementing composition of claim 9 mixed with water to form a slurry of said cementing composition in said water, wherein said water is present in said slurry in an amount in the range of from about 32 to about 125 pounds of said water per 100 pounds of said hydraulic cement.

11. The cementing composition of claim 8 mixed with water to form a slurry of said cementing composition in said water, wherein said water is present in said slurry in an amount in the range of from about 32 to about 125 pounds of said water per 100 pounds of said hydraulic cement.

* * * * *